US012580418B2

(12) United States Patent
Boettigheimer et al.

(10) Patent No.: US 12,580,418 B2
(45) Date of Patent: Mar. 17, 2026

(54) GROUND ASSEMBLY FOR AN INDUCTIVE CHARGING DEVICE

(71) Applicant: MAHLE International GmbH, Troy (DE)

(72) Inventors: Mike Boettigheimer, Kornwestheim (DE); Thomas Himmer, Reichenbach (DE); Christopher Laemmle, Stuttgart (DE); Martin Steinbach, Waiblingen (DE); Holger Schroth, Maulbronn (DE)

(73) Assignee: Mahle International GmbH (DE)

( * ) Notice: Subject to any disclaimer, the term of this patent is extended or adjusted under 35 U.S.C. 154(b) by 657 days.

(21) Appl. No.: 17/961,492

(22) Filed: Oct. 6, 2022

(65) Prior Publication Data

US 2023/0111330 A1 Apr. 13, 2023

(30) Foreign Application Priority Data

Oct. 7, 2021 (DE) ..................... 10 2021 211 349.4

(51) Int. Cl.
| | |
|---|---|
| *H01M 10/46* | (2006.01) |
| *H02J 50/00* | (2016.01) |
| *H02J 50/10* | (2016.01) |

(52) U.S. Cl.
CPC ............ *H02J 50/005* (2020.01); *H02J 50/10* (2016.02)

(58) Field of Classification Search
CPC .......... H02J 50/005; H02J 50/10; H02J 50/70; H02J 7/0042; Y02T 10/70; Y02T 90/12; Y02T 10/7072

(Continued)

(56) References Cited

U.S. PATENT DOCUMENTS

| | | | |
|---|---|---|---|
| 10,290,420 B2 | 5/2019 | Berg | |
| 2013/0181667 A1 | 7/2013 | Takeshita | |

(Continued)

FOREIGN PATENT DOCUMENTS

| | | |
|---|---|---|
| CN | 204204611 U | 3/2015 |
| CN | 112768212 A | 5/2021 |

(Continued)

OTHER PUBLICATIONS

English abstract for DE-102020202840.

(Continued)

*Primary Examiner* — Edward Tso
(74) *Attorney, Agent, or Firm* — Fishman Stewart PLLC

(57) ABSTRACT

A ground assembly for an inductive charging device for inductively charging a motor vehicle parked on a surface may include a base plate, a flat coil, a core arrangement, a lower hollow space, a support, and a heat conducting element. The flat coil may be arranged spaced apart from the base plate. The core arrangement may be arranged between and spaced apart from the base plate and a helically wound conductor of the flat coil. The support may be disposed between a core body of the core arrangement and the base plate, and may extend through the lower hollow space. The flat coil may include a stranded wire carrier, which may include a pressure pedestal arranged co-axially to the support. The heat conducting element may at least partially surround the pressure pedestal and may connect the stranded wire carrier with the core body in a heat-transmitting manner.

20 Claims, 4 Drawing Sheets

(58) Field of Classification Search
    USPC .......................... 320/104, 108, 109, 114, 132
    See application file for complete search history.

(56)                    References Cited

U.S. PATENT DOCUMENTS

| | | | |
|---|---|---|---|
| 2018/0114629 A1* | 4/2018 | Maikawa | ............ H01F 27/2823 |
| 2018/0194239 A1* | 7/2018 | Chevret | .................... B60L 5/38 |
| 2022/0103012 A1 | 3/2022 | Himmer | |

FOREIGN PATENT DOCUMENTS

| | | |
|---|---|---|
| DE | 102015200847 A1 | 6/2016 |
| DE | 102018215224 A1 | 12/2019 |
| DE | 102018215174 A1 | 3/2020 |
| DE | 102018215714 A1 | 3/2020 |
| DE | 102020202840 A1 | 9/2021 |
| DE | 102020212388 A1 | 3/2022 |
| DE | 102021205979 A1 | 12/2022 |
| DE | 102021205980 A1 | 12/2022 |
| EP | 3282460 A1 | 2/2018 |
| JP | 6804001 B1 | 12/2020 |

OTHER PUBLICATIONS

English abstract for DE-102018215714.
English abstract for DE-102018215224.
German Search Report for DE-102021211349.4, dated Jul. 22, 2022.
EESR, EP23163701, Dated Sep. 15, 2023 (w machine translation).
English translation of CN search report for CN202211224502.3, dated Dec. 30, 2025.
English abstract for CN112768212.
English abstract for CN204204611.
English abstract for JP2021175292A , which is equivalent of JP6804001B1.
English translation of CN firs OA for 202211224502.3, dated Dec. 31, 2025.

* cited by examiner

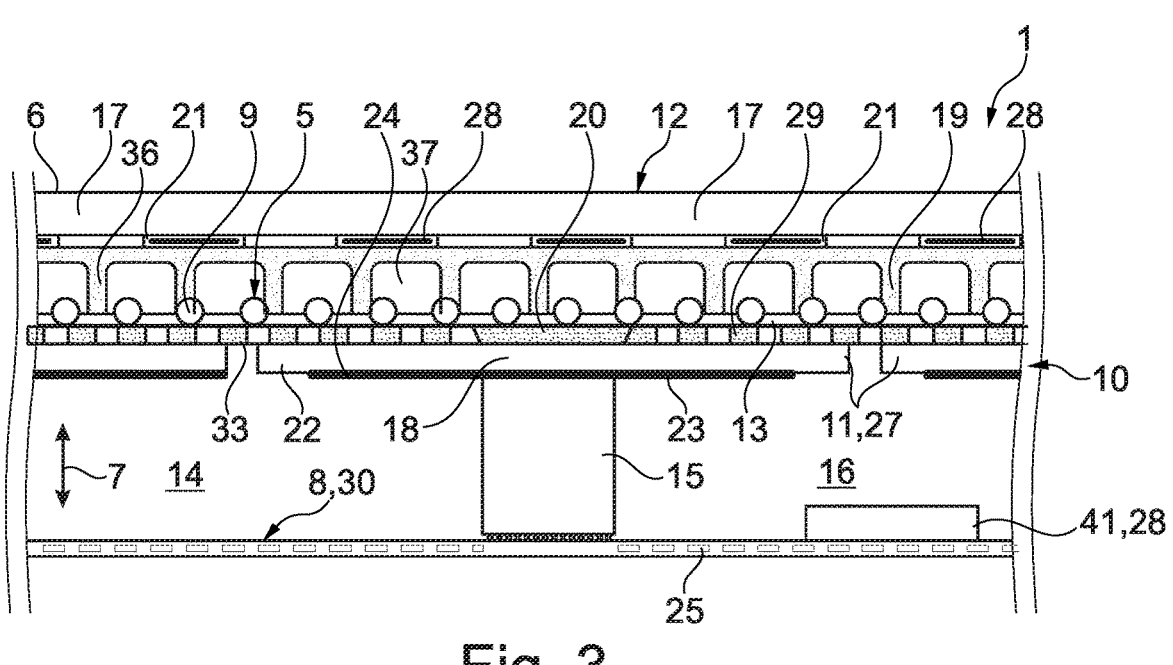
Fig. 3
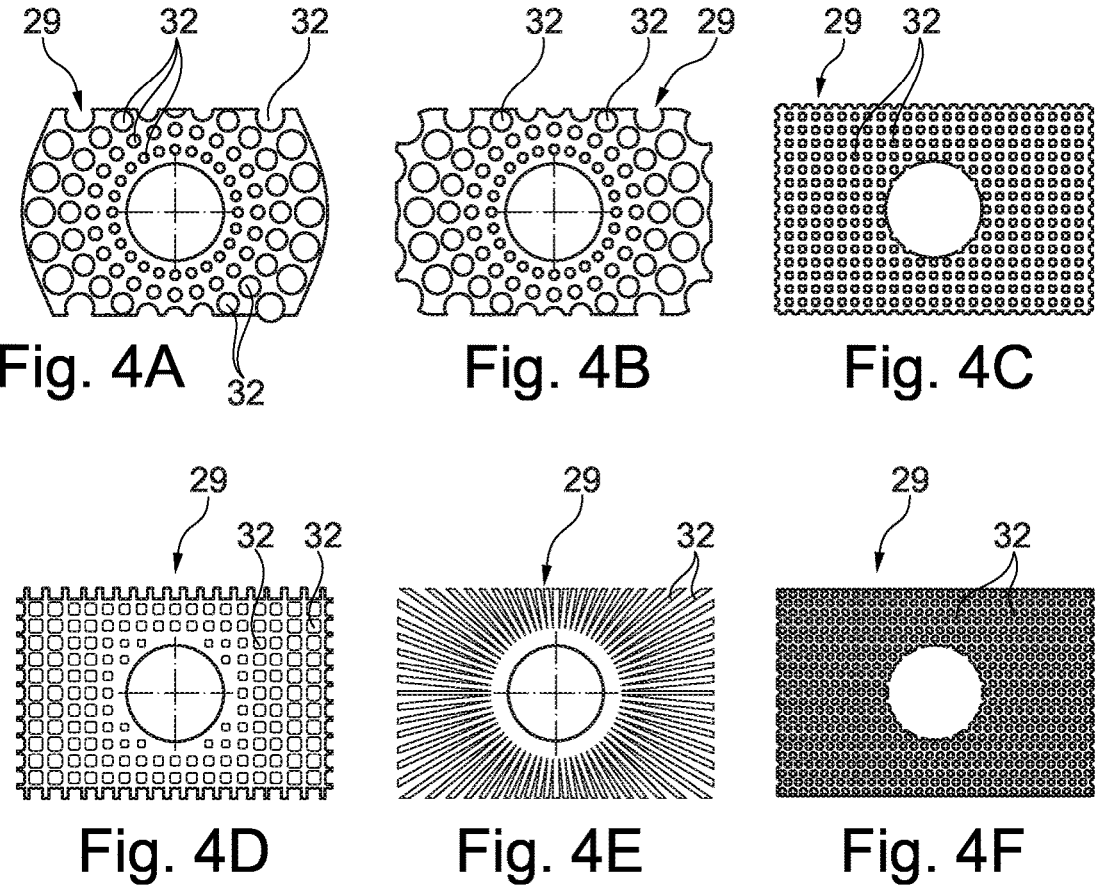
Fig. 4A    Fig. 4B    Fig. 4C
Fig. 4D    Fig. 4E    Fig. 4F

GROUND ASSEMBLY FOR AN INDUCTIVE CHARGING DEVICE

CROSS-REFERENCE TO RELATED APPLICATIONS

This application claims priority to German Patent Application No. DE 10 2021 211 349.4, filed on Oct. 7, 2021, the contents of which is hereby incorporated by reference in its entirety.

TECHNICAL FIELD

The present invention relates to a ground assembly for an inductive charging device for inductively charging a motor vehicle.

BACKGROUND

In the case of at least part-electrically driven motor vehicles, a regular charging of an electrical energy store of the motor vehicle is necessary. For this purpose, a direct electrical connection between the motor vehicle and an external electrical energy source, for example a power connection, can generally be established. However, this requires a manual activity of a user.

Further it is known to inductively charge the motor vehicle that is in particular the electrical energy store. In a ground assembly outside the motor vehicle a primary coil is located, which inductively interacts with a secondary coil (vehicle assembly) in the motor vehicle in order to charge the energy store.

During the operation of the charging device, the motor vehicle to be charged is situated on a surface above the ground assembly, which is why the ground assembly has to be configured in such a manner that it can support the load of the motor vehicle to be charged. Further, heat can develop in the ground assembly during the operation of the charging device by way of the charging power produced, which heat can lead to an undesirable increase in temperature of the ground assembly and connected with this also to a failure of the electrical and/or electromagnetic components.

An undesirable heating of the ground assembly can occur in particular between a conductor of a flat coil and a core body. In this region, no electrically conducting materials can be used because of the very high field strengths, so that a heat conduction between conductor and core body (magnetic field conductor) is always accompanied by a major temperature differential. This must be considered critical in particular since, according to popular design, roughly twice as many losses are incurred in the conductor as in the core bodies, so that a limit temperature of a commercially available conductor (approximately 140° C.) for a ground assembly with 11 kW power can only be maintained with very low temperatures of a temperature synch (base plate). However, in particular in unfavourable climatic conditions (e.g. hot country conditions with a maximum ambient temperature of 50° C.), this low temperature cannot be provided or only with major expenditure (installation space, costs), which is why an early derating is carried out here, so that the customer instead of for example 11 kW can possibly charge only with 6 kW. In the case of a poor cooling concept, this operating point can occur even after a few minutes.

SUMMARY

The present invention therefore deals with the problem of stating for a ground assembly for an inductive charging device an improved or at least another embodiment which in particular overcomes the disadvantages known from the prior art.

According to the invention, this problem is solved through the subject matter of the independent claim(s). Advantageous embodiments are the subject matter of the dependent claim(s).

The present invention is based on the general idea of avoiding an early derating in a ground assembly in that a targeted heat dissipation from a conductor of a flat coil of the ground assembly into a core body and from there into a base plate is made possible and an efficient cooling of the flat coil thereby achieved. With the ground assembly according to the invention, higher charging power with same conductor cross-section or a same charging power with reduced conductor cross-section can be transmitted. The ground assembly according to the invention for an inductive charging device for inductively charging a motor vehicle parked on a surface, for example an electric vehicle, comprises in detail a base plate formed in particular as cooling plate, which extends plate-like transversely to a distance direction. Here, the distance direction is the surface normal of the base plate and in the installed state usually a vertical. The ground assembly according to the invention additionally comprises at least one flat coil which is designed as primary coil or field coil, and which possesses a helically wound conductor and is spaced apart from the base plate in the distance direction at the same time. Likewise provided is a core arrangement for the magnetic flux control, which is spaced apart from the base plate and from the flat coil in the distance direction and arranged between the base plate and the flat coil. Between the core body and the base plate, a lower hollow space is formed in which at least one support is arranged, so that this at least one support extends through the lower hollow space in the distance direction. By way of the at least one support, the core body and thus the core arrangement is supported on the base plate. In addition, the flat coil possesses a stranded wire carrier which comprises at least one pressure pedestal arranged co-axially to an associated support, via which the stranded wire carrier is supported on an associated core body of the core arrangement, wherein a heat conducting element is provided, which surrounds the pressure pedestal at least partially and connects the stranded wire carrier with the core body in a heat-transmitting manner. The at least one support is now formed as heat conducting element out of a material having a heat conductivity of $\lambda > 5$ W/(m·K). Thus, when the flat coil is heated during the operation of the ground assembly according to the invention, the conductor cannot only be subjected to heat dissipation and thus cooled by the support and the ferrite arrangement, but simultaneously also by way of the heat conducting element surrounding the pressure pedestal, as a result of which a same charging power with lower cross-section of the conductor of the flat coil and/or of the ferrites of the core arrangement or a higher charging power with same cross-section of the conductor of the flat coil and/or of the ferrites of the core arrangement can be achieved. By way of the pressure pedestal according to the invention arranged co-axially to the respective axis of the support on the stranded wire carrier, a positioning of the support with respect to the associated core body in a region in which even when employing metallic materials for the support, no eddy current losses or hysteresis losses can additionally occur. The individual core bodies, for example the ferrite plates, are spaced apart from one another transversely to the distance direction, wherein transversely to the distance direction the magnetic flux density both between the individual core bodies and also in the edge region of the same is significantly greater than in the respective central region of the core body, in which the support is arranged. In addition it is thus possible to introduce loads, for example from vehicles driving on the ground assembly, into the core bodies and from these into the supports preferentially exclusively as pressure loads and not as bending loads via the pressure pedestals. The arrangement of the supports with respect to the associated core body takes place in the central region as a result of which both the mechanical load capacity can be increased and also an influencing of a magnetic field of the flat coil minimised. Here, the central region is delimited in each case in the longitudinal direction and width direction by for example 80% of the diameter of the individual core bodies each in the longitudinal direction and width direction, preferentially 70% of the diameter of the individual core bodies each in the longitudinal direction and the width direction, particularly preferably 50% of the diameter of the individual core bodies each in the longitudinal direction and width direction and most preferably 30% of the diameter of the individual core bodies each in the longitudinal direction and the width direction.

The ground assembly according to the invention can be arranged recessed into a surface, in particular flush with the surface, wherein alternatively an arrangement on the surface is obviously also conceivable.

In an advantageous further development, the base plate is formed as cooling plate having at least one cooling channel for a coolant. By way of this, an active cooling of the base plate is possible during the operation, wherein the heat-conducting supports also bring about a cooling of the core arrangement or the core bodies and the flat coil arranged above the same in the installed state at the same time. In addition, the actively cooled base plate in turn cools the air within the lower hollow space, as a result of which a cooling of electronics arranged there and also an air cooling of the core arrangement or core body arranged above the lower hollow space is possible. Regions on which the respective supports are supported on the base plate preferentially do not have any cooling channels in order to be able to ensure adequate pressure stability.

In an advantageous further development of the ground assembly according to the invention, the heat conducting element comprises thermally conductive particles embedded in plastic, for example in silicone, wherein the plastic has a shore hardness of H<10. Such a heat conducting element, which is also referred to as thermal interface material (TIM), offers the major advantage that regions of the electrical conductor of the flat coil further distant from the support formed as heat conducting element transversely to the distance direction can also be reliably subjected to heat dissipation and thus cooled, since the heat conducting element makes possible a direct transfer of the heat to be dissipated into the core body, for example the ferrite plate, and in addition to this into the support formed as heat conducting element. By way of this, a temperature differential between the core body and within the flat coil can be kept low. Because of the comparatively soft plastic material of the heat conducting element it is additionally possible to introduce high pressure loads, for example from motor vehicles driving on the ground assembly, into the respective supports exclusively as pressure loads, since the comparatively elastic heat conducting element does not result in bending tensile stresses and thus the risk of a breakage of the respective core body. Thus, a transfer of the loads produced for example by motor vehicles driving on the ground assembly thus takes place from the stranded wire carrier to the core body arranged below and the support in turn arranged below, almost exclusively via the pressure pedestal, as a result of which no bending tensile stresses occur in the core body, for example the ferrite plate.

Practically, the heat conducting element comprises recesses, wherein a density and/or a size of the recesses increases with increasing distance from the pressure pedestal or the recesses are arranged evenly distributed. In order to ensure a displacement of the heat conducting element, for example consisting of an elastomer material with electromagnetically neutral particles, in particular aluminium nitride particles, because of a flexion of the stranded wire carrier that occurs as a result of motor vehicles driving over the ground assembly, the heat conducting element can be equipped with the previously mentioned recesses, for example gaps. With the higher density and/or size of the recesses with increasing distance from the pressure pedestal, the ability of the heat conducting element of transmitting pressure loads decreases since the recesses constitute hollow spaces into which the heat conducting element, for example an elastomer plastic, can be displaced when pressure loads occur without transmitting larger pressure loads onto the core body in the process, within which these would lead to unfavourable tensile stresses in this region.

Through the individual recesses in the heat conducting element a type of hole-pattern is created between a lower stranded wire carrier or the stranded wire carrier and the core body, wherein this hole-pattern can be embodied as regular hole-pattern or orientate itself on the dimension of the flexion of the stranded wire carrier between the individual supports. Here, fewer recesses or holes are provided in the vicinity of the supports because of the reduced flexion there and in regions further distant from there, larger or more recesses, into which much or more material of the heat conducting element can be displaced upon high compression. By way of such a distribution of the recesses and of the irregular thermal contact resistance between the conductor of the flat coil and the core body accompanied by this, it can be additionally achieved that the heat loss of the conductor is directed in the direction of the support region even within the conductor windings and thus a lateral heat conduction in the core body, which would result in higher temperature differentials, can be reduced.

In an advantageous further development of the ground assembly according to the invention, the heat conducting element is formed as a separate component, for example as a perforated film or applied to the stranded wire carrier or the core body by the screen-printing method. When installed by means of for example screen-printing methods or as dispensed paste, an introduced and not yet hardened plastic material of the heat conducting element can additionally serve for example as adhesive between the stranded wire carrier and the core body. To increase the thermal conductivity of the plastic of the heat conducting element, the same can be additionally mixed with electromagnetically neutral particles, such as for example aluminium nitride particles. By way of this, a thermal conductivity can be increased to >0.5 W/(m·K) in particular >1.0 W/(m·K). By way of this, a heat transfer and thus cooling of the flat coil that is again improved is possible.

In a further advantageous embodiment of the ground assembly according to the invention, the stranded wire carrier comprises an upper stranded wire carrier and a lower stranded wire carrier, between which the flat coil is arranged. By way of this, a comparatively simple assembly of the flat coil in the licence carrier consisting of two parts, namely the upper licence carrier and the lower licence carrier is possible. The heat conducting element according to the invention is connected in a heat-transmitting manner both to the core body and also to the lower stranded wire carrier outside the pressure pedestal and makes possible a uniform heat dissipation and cooling of the flat coil. The conductor of the flat coil in this case can be surrounded at least partially by a heat-conducting sheath. Such a jacket can be advantageous in particular also with a stranded wire carrier formed in one piece, since by way of this a thermal resistance between the electrical conductor of the flat coil and the stranded wire carrier can be reduced. However, such a sheath can also be employed with a split stranded wire carrier, in the case of which an upper stranded wire carrier and a lower stranded wire carrier can be joined following the insertion of a flat coil. For this purpose, a negative mould that is larger with respect to the electrical conductor of the flat coil can be provided for example in the upper and lower stranded wire carrier, so that the electrical conductor with completely joined upper and lower stranded wire carriers is arranged with clearance in the stranded wire carrier. For this purpose, the sheath can be implemented in the form of a dispensed elastomer interface material (sheath) introduced into the cavities of the upper and/or lower stranded wire carrier. Such a dispensed material is subsequently compressed between the stranded wire carrier and the electrical conductor through the introduction of the stranded wire and the joining of the upper and lower stranded wire carrier in the gap between the stranded wire carrier and the electrical conductor and fills out the same at least partially. In order to simplify a displacement of the interface material (sheath) in the cavity it is practical to provide in the slot regions without interface material at certain intervals. These delimited regions with poorer thermal connection are not problematic for a heat dissipation of the conductor of the flat coil since the copper of the conductor possesses a very good lateral heat conductivity and the heat dissipation can thus take place by way of adjacent regions that are favourably connected thermally.

Alternatively or additionally it is also conceivable that following the assembly of the upper and lower stranded wire carrier and of the conductor arranged therein the interface material (sheath) is pressed into intermediate spaces between the conductor and the respective stranded wire carrier by way of suitable openings. To this end, ventilation openings can be provided at regular intervals. In a particularly preferred form, the channels for the thermal interface material, that is the sheath, are routed in the lateral direction to the conductor in regions between two conductors, as a result of which the cured thermal interface material results in an improved mechanical connection of the upper and lower stranded wire carrier.

In order to be able to produce a stranded wire carrier in as weight-optimised as possible a manner, a cavity can also be provided for example on the lower stranded wire carrier in which the flat coil is inserted. The conductor of the flat coil can likewise be connected to the lower stranded wire carrier in a heat-transmitting manner by way of a suitable thermal interface material. Alternatively it is also conceivable that following the insertion of the flat coil in the cavity of the lower stranded wire carrier, the rest of the carrier of the lower stranded wire carrier can be cast with or at least partially cast with a casting material for example an epoxy resin as a result of which the electrical conductor of the flat coil is connected to the lower stranded wire carrier in a thermally optimised manner. A thermal connection of the conductor to the lower stranded wire carrier is preferably implemented with a thermal contact resistance of <0.2 K/W, preferably <0.1 K/W.

In a further advantageous embodiment of the solution according to the invention, the conductor of the flat coil penetrates the lower stranded wire carrier, wherein between the conductor and the core body an electrically insulating layer, in particular an insulation film having a dielectric strength of D>10 k/V, in particular of D>20 k/V is arranged. By way of this, an adequate insulation of the conductor relative to the core body is provided in order to avoid an undesirable electrical arc-over from the conductor to the core body.

In a further advantageous embodiment of the invention, a stranded wire holder of plastic is provided, which holds the conductor in its helical form, wherein the stranded wire holder and the conductor are completely embedded in a plastic matrix and wherein the conductor can be coated with a coating increasing the heat conduction and the adhesion to the plastic matrix. In this variant, the stranded wire carrier can be embodied as a completely encapsulated unit in the mould, so that a comparatively delicate stranded wire holder made of plastic accommodates the conductor or the stranded wire in the desired helical mould and is subsequently encapsulated in a mould provided for this purpose. Preferably, this takes place in a position that is inverted with respect to the installation position of the ground assembly, so that no penetration of the stranded wire holder by the casting material of the stranded wire carrier on the side which in the ground assembly faces the respective core bodies can occur. By way of this, the dielectric strength can be ensured. By way of the coating provided, it is not only possible to improve a mechanical connection between conductor and stranded wire carrier but also a heat transmission between these components.

Practically, positioning elements for fixing in position at least one core body transversely to the distance direction are arranged on the stranded wire carrier. Such positioning elements can be formed for example integrally with the stranded wire carrier or the lower stranded wire carrier and serve for the reliable positioning of the core bodies transversely to the distance direction. By way of such positioning elements, a mounting of the ground assembly according to the invention can also be facilitated.

Practically, an air flow path leads through the lower hollow space of the ground assembly according to the invention. Cooling of the core arrangement and in addition also of the flat coil can thus take place exclusively by an air flow, which flows in the lower hollow space, or by such an air flow and additionally a base plate formed as cooling plate. The latter version offers a significantly higher cooling output and thereby makes possible higher charging powers of the charging device.

In an advantageous further development of the solution according to the invention, the at least one support consisting of a material having a heat conductivity of $\lambda > 10$ W/(m·K), in particular a heat conductivity of $\lambda > 50$ W/(m·K) or $\lambda > 100$ W/(m·K). Thus, for example iron with a heat conductivity $\lambda$ of approximately 80 W/(m·K), but also made of aluminium with a heat conductivity $\lambda$ of 235 W/(m·K) is possible for the respective supports. Purely theoretically it is even conceivable that plastics having corresponding metal particles are employed, which can provide the heat transmission or heat conductivity of $\lambda > 5$ W/(m·K) required for the desired cooling effect.

In an advantageous further development of the solution according to the invention, the at least one support is made at least partially of metal, in particular of aluminium. Alternatively it is also conceivable however that the at least one support is partly formed out of graphite or out of ceramic, in particular of aluminium nitride or aluminium silicide. Graphite has a heat conductivity λ of 15 to 20 W/(m·K), while an aluminium nitride ceramic can possess a conductivity λ of even 180 W/(m·K). The use of such aluminium nitride ceramics in particular is in particular of major interest in particular where a lot of heat has to be dissipated, but a material may not be electrically conducting under certain conditions.

The base plate itself is advantageously made of a metal or of a metal alloy, for example aluminium, in order to improve a heat transmission between coolant, base plate, air and supports. By way of the arrangement of the base plate spaced apart from the flat coil and the core arrangement, an electromagnetic interactive effect of the base plate with the flat coil and the core arrangement is additionally minimised or even reduced. A distance of the base plate from the core arrangement in the distance direction can amount to between multiple millimetres and multiple centimetres. By producing the base plate out of metal or a metal alloy, an electromagnetic shielding of the ground assembly downwards towards the surface additionally takes place.

In a particularly advantageous embodiment of the ground assembly according to the invention, a distributor plate is provided between at least one support and one core body, which distributor plate is connected via an adhesive layer having a heat conductivity of λ>0.8 W/(m·K) and/or a shear modulus of G<10 MPa. Since the adhesive layer, for example a coating of an adhesive is extremely thin, a reduced heat conductivity λ of λ>0.8 W/(m·K) is adequate here. In order to additionally be able to offset different thermal expansion coefficients between the core bodies, for example a ferrite plate, and the distributor plate it is advantageous to furnish the adhesive coating or generally the adhesive layer with a shear modulus G<10 MPa.

Further important features and advantages of the invention are obtained from the subclaims, from the drawings and from the associated figure description by way of the drawings.

It is to be understood that the features mentioned above and still to be explained in the following cannot only be used in the respective combination but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

FIG. 3 shows a representation as in FIG. 1, however in another embodiment, FIGS. 4A, 4B, 4C, 4D, 4E and 4F show different heat conducting elements with different recesses.

DETAILED DESCRIPTION

Figure 1:
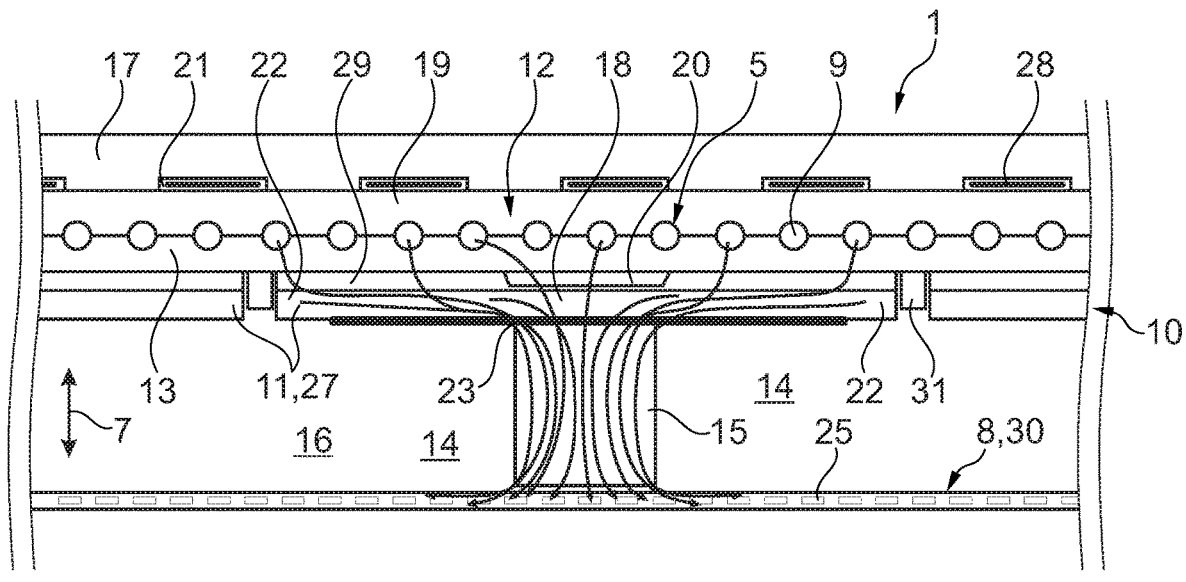
FIG. 1 shows a section through a ground assembly according to the invention with an inductive charging device.
Figure 2:
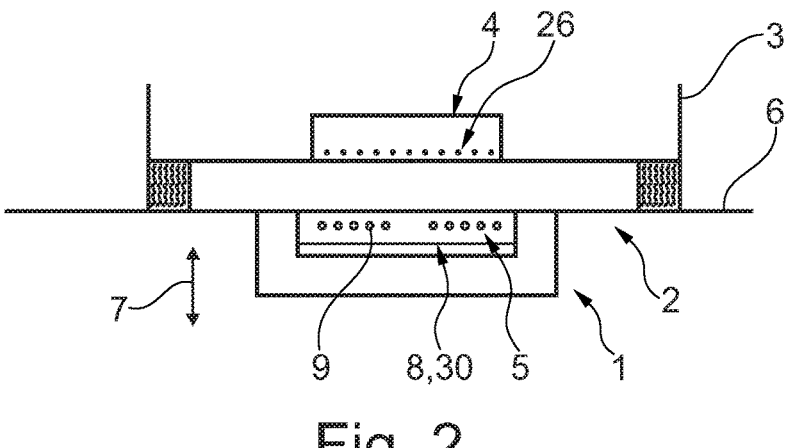
FIG. 2 shows a greatly simplified representation of the inductive charging device with the ground assembly and a motor vehicle.

A ground assembly 1 according to the invention, such as shown for example in the FIGS. 1 and 3, is employed in a charging device 2 shown in FIG. 2 for inductively charging a motor vehicle 3. For this purpose, the ground assembly 1 interacts with an associated assembly 4 of the motor vehicle 3, for example a secondary coil 26. The interaction takes place in particular by way of a flat coil 5 of the ground assembly 1, which serves as primary coil of the charging device 2, and the secondary coil 26 of the assembly 4 of the motor vehicle 3. For inductively charging by means of the charging device 2, the motor vehicle 3 is parked on a surface 6. In the shown exemplary embodiment, the ground assembly 1 is arranged recessed into the surface 6, but can also be arranged on the same.

The ground assembly 1 comprises a base plate 8 formed for example as a cooling plate 30. Here, the distance direction 7 runs parallel to a normal of the surface 6 and in particular along the vertical direction. According to the FIGS. 1 and 3, the flat coil 5 is spaced apart from the base plate 8 in the distance direction 7. The flat coil 5 is equipped with a helically wound conductor 9 that can be formed for example out of copper. The ground assembly 1 further includes a core arrangement 10 for the magnetic flux control, which is arranged in the distance direction 7 spaced apart from the base plate 8 and from the flat coil 5 and between the base plate 8 and a helically wound conductor 9 and additionally comprises at least one core body 11. In addition, the core arrangement 10 is spaced apart from the flat coil 5 in the distance direction 7. Here, the core arrangement 10 with the at least one core body 11 is arranged between the base plate 8 and the flat coil 5. The core body 11 can be formed out of a soft-magnetic material in particular out of a soft-magnetic ferrite. Between the at least one core body 11 and the base plate 8, a lower hollow space 14 is formed, through which an air flow path can lead and/or in which at least one electronic component 41, in particular a circuit board 28, can be arranged.

The core arrangement 10, in particular the at least one core body 11, supports itself for example directly on a support 15 (see FIGS. 1 and 3). The core body 11 can be formed for example as ferrite plate 27. The respective core body 11 is formed plate-like and extends plate-like in the width direction and a longitudinal direction running transversely to the width direction and transversely to the distance direction 7, plate-like. The support 15 extends in the distance direction 7 through the lower hollow space 14 and is formed as a heat conducting element out of a material having a heat resistance of λ>5 W/(m·K). In addition, the flat coil 5 comprises a stranded wire carrier 12, having an upper stranded wire carrier 19 and a lower stranded wire carrier 13, between which the conductor 9 of the flat coil 5 is arranged. Here, the stranded wire carrier 12 carries the conductor 9 of the flat coil 5, so that this can also be called a conductor carrier 9. The stranded wire carrier 12 or the lower stranded wire carrier 13 of the same comprises a pressure pedestal 20 arranged co-axially to an associated support 15, via which pressure pedestal 20 the stranded wire carrier 12 is supported on an associated core body 11 of the core arrangement 10, as a result of which it is possible to introduce loads, for example of motor vehicles 3 driving on the ground assembly, exclusively as pressure loads and not as bending loads into the core bodies 11 and from these into the supports 15.

Here, the pressure pedestal 20 can be formed separately from the lower stranded wire carrier 13 or be formed integrally with the same. Since ferrite is highly pressure resistant, such a core body 11 can very favourably absorb a pure pressure loading.

Round about the pressure pedestal 20, the lower stranded wire carrier 13 is set off from the core body 11, i.e. spaced apart, so that a load introduction into the core body 11 takes place exclusively via the pressure pedestals 20. Because of this, the mechanical load capacity and the charging power of the ground assembly 1 can be significantly increased. In order to be able to achieve improved cooling of the flat coil 5, a heat conducting element 29 is provided, which at least partially surrounds the pressure pedestal 20 and connects the stranded wire carrier 12 with the core body 11 in a heat-transmitting manner.

The heat conducting element 29 (thermal interface material) can comprise thermally conductive particles embedded in plastic, in particular in silicone, wherein the plastic preferentially has a shore hardness A<10. The heat conducting element 29 is thus embodied so as to be comparatively soft and thus does not substantially load the ferrite plate 27 upon a flexion of the stranded wire carrier 12 caused by a drive-over load between the main load paths of the supports 15. When mounting the ferrite plate 27, such a load would result in bending tensile stresses and increase the danger of a breakage of the core body 11.

In order to ensure the displacement of the material of the heat conducting element 29 because of the flexion of the stranded wire carrier 12, the heat conducting element 29 can comprise recesses 32 (see FIGS. 4A-4F), wherein a density and/or a size of the recesses 32 increases with increasing distance from the pressure pedestal 20 or the recesses 32 are arranged evenly distributed. Thus, sufficient gaps can be installed. A hole pattern in the heat conducting elements 29 between the lower stranded wire carrier 13 and the core body 11 can be embodied as regular hole pattern (see FIGS. 4C and 4F) or as described at the outset orientate itself at the dimension of the flexion of the stranded wire carrier 12 between the supports 15. The recesses 32 proper can be formed round (see FIGS. 4A, 4B, 4F), rectangular (see FIGS. 4C, 4D) or even elongate, in particular in the manner of radial rays (see FIG. 4E). In the vicinity of the supports 15 or of the pressure pedestal 20, fewer recesses 32 are provided because of the reduced flexion there and more in regions that are further distant, into which also more material of the heat conducting element 29 (TIM material) upon higher compression can be displaced. By way of such a distribution of the recesses 32 and of the irregular thermal contact resistance between stranded wire carrier 12 and ferrite plate 27 or core body 11 accompanied by this, it can be additionally achieved that the heat loss of the flat coil 5 is conducted in the direction of the supports 15 even within the windings of the conductor 9 and the lateral heat conduction in the core body 11, which would have higher temperature differentials as a consequence, is thus reduced.

For example, the heat conducting element 29 can be formed as a separate component, in particular as a perforated film, or as sequentially dispensed paste or as screen-print. Upon installation by a dispensing method, the heat conducting element 29 introduced and not yet cured can additionally serve as adhesive between stranded wire carriers 12 or lower stranded wire carrier 13 and core body 11.

According to FIGS. 1 and 5A-5E, the stranded wire carrier 12 comprises an upper stranded wire carrier 19 and a lower stranded wire carrier 13, between which the flat coil 5 or the conductors 9 of the same are arranged. From the lower stranded wire carrier 13, positioning elements 31 can project in the direction of the core bodies 11 (see FIG. 1), which make possible a positioning of the core bodies 11 transversely to the distance direction 7.

Further, the core body 11 comprises a central region 18 and at least one edge region 22 (see FIGS. 1 and 3). At least one of the supports 15 is preferentially arranged transversely to the distance direction 7 within the central region 18 of an associated core body 11, connecting the same and the base plate 8 in a heat-transmitting manner. This offers the major advantage that by way of the supports 15 formed as heat conducting elements, both the core arrangement 10, the flat coil 5 with its conductors 9 as well as the core bodies 11, for example the ferrite plates 27, can be connected in a heat-transmitting manner to the base plate 6 formed as cooling plate 30 and thereby cooled effectively. Through the contacting of the supports 15 in the associated central region 18 with the associated core bodies 11, any influencing of the magnetic field produced by the flat coil 5 and in particular of a magnetic flux density is minimal, so that for the supports 15 formed as heat conducting elements according to the invention, even metallic materials can be considered.

The support 15 merely fills out the lower hollow space 14 partially, so that a flow space 16 for a fluid, in the shown exemplary embodiments for air, remains, as a result of which the core arrangement 10 can pass heat on to the base plate 8 via the air and a cooling of the core arrangement 10 and of the flat coil 6 can be improved and consequently the efficiency of the ground assembly 1 increased. It is thus also possible to operate the ground assembly 1 with high outputs of in particular multiple kW and consequently charge the motor vehicle 3 to be charged more rapidly and without causing any derating in any operating point.

Practically, a distributor plate 23 is arranged between the at least one support 15 and the core body 11. Such a distributor plate 23 can ensure an improved heat transmission and thus an improved cooling of the core arrangement 10, wherein it is obviously clear that the distributor plate 23 can also be arranged within the central region 18 in order to at least minimise in particular any influencing of the magnetic field and thus the producing of eddy current losses. Since the distributor plate 23, having a thickness<2 mm is very flat and arranged closely below the core arrangement 10, the central region belonging to the distributor plate 23 can be larger and the edge region belonging to the distributor plate 23 can be smaller than the central region 18 or edge region 22 belonging to the support 15, without major additional losses through eddy currents or hysteresis effects that cannot be tolerated developing in an electrically conductive material of the distributor plate 23.

In addition to this, the distributor plate 23 can be connected to the core arrangement 10 by way of an adhesive layer 24 of a material having a heat conductivity of $\lambda > 0.8$ W/(m·K) and/or a shear modulus of G<10 MPa. Since the adhesive layer 24 is extremely thin and has a large connecting surface to the core arrangement 10, a reduced heat conductivity $\lambda$ of $\lambda > 0.8$ W/(m·K) is also adequate here. In order to be able to additionally offset different thermal expansion coefficients between the core bodies 11, for example a ferrite plate 27 and the distributor plate 23, it is advantageous to furnish the adhesive layer or generally the adhesive coating 24 with a shear modulus G>10 MPa. Obviously, the adhesive layer 24 can also be provided directly between the support 15 and the core body 11, provided that for example no distributor plate 23 is provided. When a distributor plate 23 is present, an additional adhesive layer can also be provided between the distributor plate 23 and the support 15.

A thickness of the distributor plate 23 is in the range from 0.2 to 2.0 mm. Besides an enlargement of the heat-transmitting contact surface between core body 11 and support 15, the at least one distributor plate 23 can also fulfil a supporting function.

In the shown exemplary embodiments, the ground assembly 1 comprises a cover plate 17. Between the cover plate 17 and the upper stranded wire carrier 19, hollow spaces 21 are provided in which for example a circuit board 26 can be arranged. In the shown exemplary embodiments, the base plate 8 is formed as a cooling plate 30, through which cooling channels 25 for a coolant run. The coolant actively cools the base plate 8 during the operation. The actively cooled base plate 8 cools via the supports 15 the core arrangement 10 or the core bodies 11 and the flat coil 5 and additionally the air and consequently, by way of the air, in turn the flat coil 5 and the core arrangement 10. Here, the base plate 8 is advantageously produced from a metal or a metal alloy, in particular aluminium in order to improve the heat transmission between coolant, base plate 8 and air. By way of the arrangement of the base plate 8 spaced apart from the flat coil 5 and the core arrangement 10, a magnetic or electromagnetic interaction of the base plate 8 with the flat coil 5 and the core arrangement 10 is minimised or at least reduced. The distance of the base plate 8 from the core body 11 can be between 10 and 80 mm. By producing the base plate 8 out of a metal or a metal alloy, an electromagnetic shielding of the ground assembly 1 materialises at the same time.

Figure 5A:
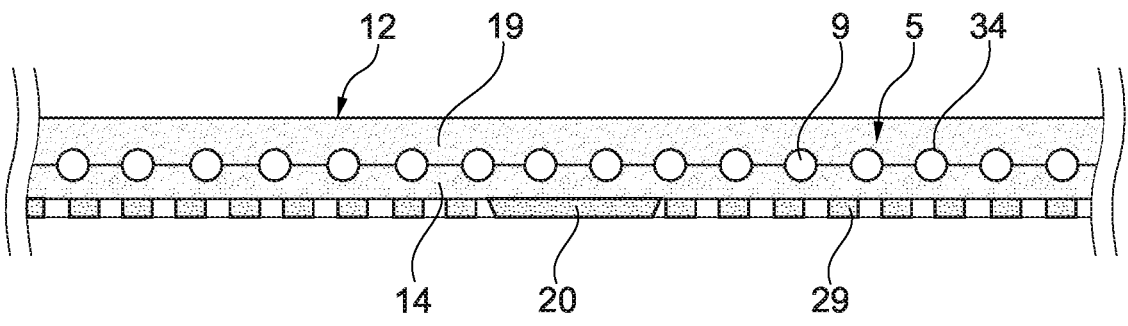
FIGS. 5A, 5B, 5C, 5D and 5E show sectional representations through different embodiments of the stranded wire carrier.
Figure 5B:
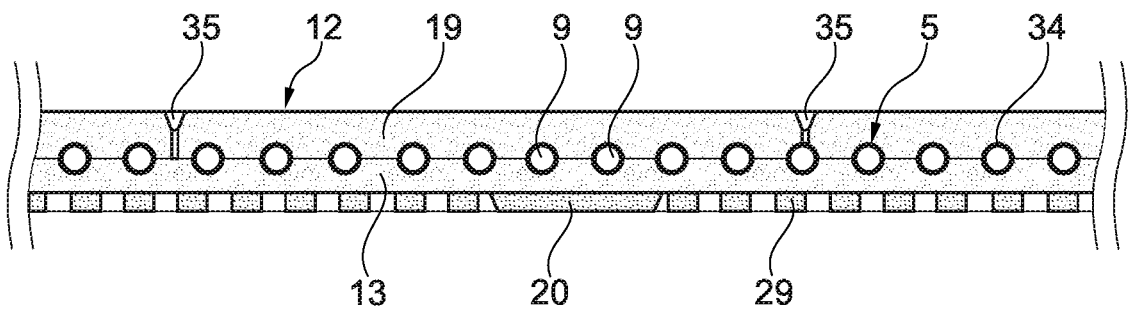
Figure 5C:
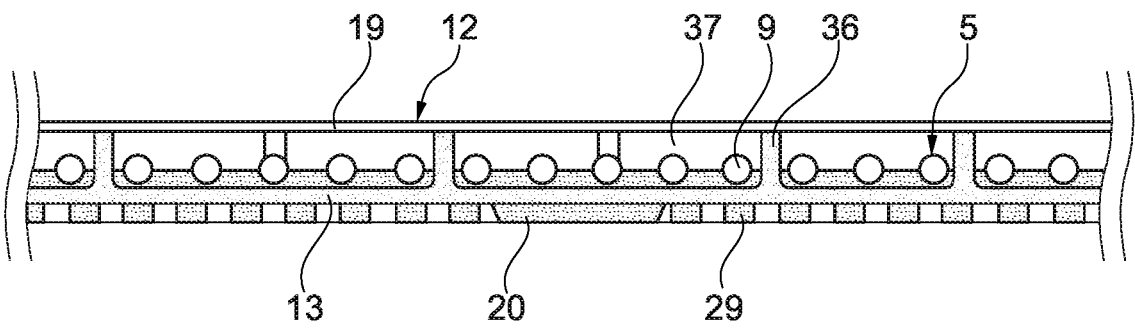
Figure 5D:
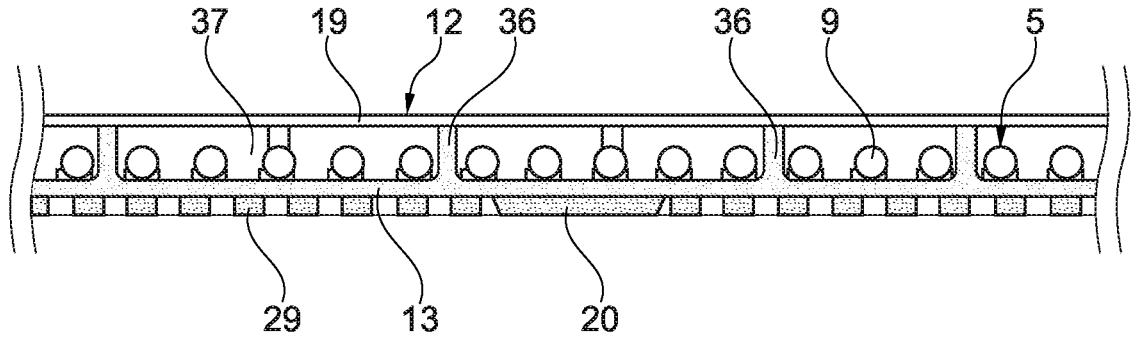
Figure 5E:
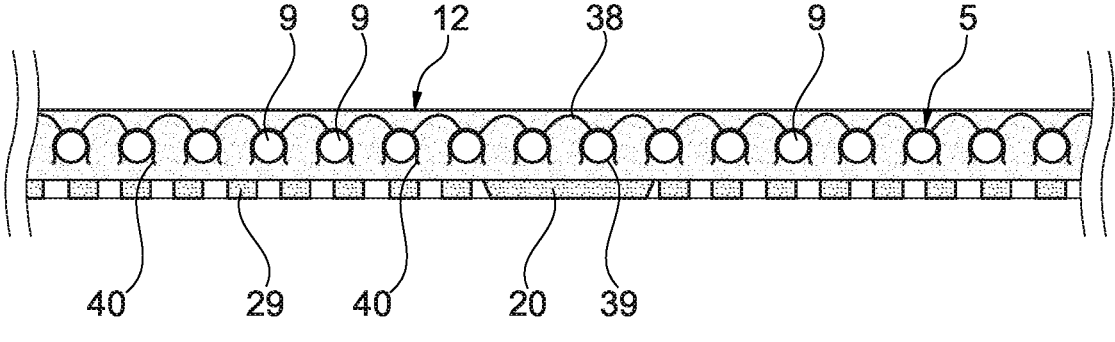

According to FIGS. 1 and 5A and 5E, the conductor 9 of the flat coil 5 is completely enclosed by material of the heat conducting elements 29, as a result of which the conductor 9 is adequately insulated against the core body 11 in order to avoid an electrical arc-over from the conductor 9 to the core body 11. Purely theoretically, a continuous electrically insulating layer 33 can be additionally provided between the conductor 9 and the core body 11, in particular an insulation film having a dielectric strength of D>10 kV, in particular of D>20 kV, in particular as carrier material for the heat conducting element 29, as is shown for example in FIG. 3. In FIG. 3, the conductor 9 penetrates the lower stranded wire carrier 13, as a result of which such a layer 33 is required.

Alternatively, the insulation protection can also be achieved by a closed lower stranded wire carrier 13. The disadvantage with such a solution however is that there is generally a higher thermal resistance between conductor 9 and lower stranded wire carrier 13. This can be reduced further for example in that between the conductor 9 and at least the lower stranded wire carrier 13, a further thermal interface material is introduced.

This can be effected for example as shown in FIG. 5B by an at least partially heat-conducting sheath 34 of the conductor 9. Alternatively, a coating of the receiving cavity (slot) in the upper and/or lower stranded wire carrier 19, 13 or be realised by an elastomer interface material dispensed into this slot prior to introducing the conductor 9. Such a dispensed material is subsequently compressed in the gap between conductor 9 and the stranded wire carriers 13, 19 by introducing the conductor 9 and joining the upper and lower stranded wire carriers 19, 13 and fills out the said gap at least partially. In order to simplify displacing the interface material in the cavity, it is practical to provide regions without interface material in the slot at certain intervals. For the heat dissipation of the conductor 9, these delimited regions with poorer thermal connection are not problematic, since the copper of the stranded wire or of the conductor 9 possesses a very good lateral heat conductivity and the heat dissipation can therefore take place by way of adjacent regions that are favourably connected thermally.

Alternatively or complementarily, ventilation openings 35 (see FIG. 5B) can also be provided at regular intervals in the upper stranded wire carrier 19, which is pressed in the assembly sequence onto the unit consisting of lower stranded wire carrier 13, dispensed interface material and conductor 9. It is likewise conceivable that following the assembly of upper and lower stranded wire carriers 19, 13 with the conductor 9 the interface material is pressed into the cavities by way of suitable openings and channels. In a particularly preferred form, channels are routed in the lateral direction to the conductor course in the region between two conductors 9. Because of this, the cured thermal interface material likewise results in a better mechanical connection of the upper and lower stranded wire carriers 19, 13.

For stranded wire carriers 12 in a light-weight construction variant according to FIG. 3, FIG. 5C and FIG. 5D, in which the lower and upper stranded wire carriers 13, 19 are connected to form a mechanical unit via ribs 36 and the conductor 9 is inserted in a remaining cavity 37 in between, the conductor 9 can be glued to the lower stranded wire carrier 13 for better thermal connection. Alternatively, the remaining cavity 37 of the lower stranded wire carrier 13 with the inserted conductor 9 located therein can also be cast with a casting material or at least partially cast, so that following the curing of the casting material (for example epoxy resin), the conductor 9 is favourably connected thermally to the lower stranded wire carrier 13. The thermal connection of the conductor 9 to the lower stranded wire carrier 13 is preferably realised with a thermal contact resistance of less than 0.2 k/W, preferably of less than 0.1 k/W.

According to FIG. 5E, a stranded wire holder 38 made of plastic is additionally provided, which holds the conductor 9, wherein the stranded wire holder 36 and the conductor 9 are completely embedded in a plastic matrix of the stranded wire carrier 12 and wherein the conductor 9 is coated with a coating 39 increasing the heat conduction and the adhesion to the plastic matrix. The stranded wire carrier 30a comprises C-shaped openings 40, which make possible an easy clipping-on of the conductors 9 of the flat coil 5 and thus a simple fixing of the flat coil 5. Following this, the conductor 9 is encapsulated with the plastic matrix.

With the ground assembly 1 according to the invention, multiple advantages can be achieved:

improved heat dissipation and loading of the core bodies 11 and thus long lifespan and low risk of breakage of the same, no additional active components for improving the heat transport, in particular no air flow, thin construction of the thermal connection by using heat-conducting supports 15, in particular made of metal, free installation space for electronic components including attachment options for electronic components, simple and cost-effective construction, can be flexibly adapted to performance class and ambient conditions, function integration of electromagnetics electronics thermionics mechanics.

The invention claimed is:

1. A ground assembly for an inductive charging device for inductively charging a motor vehicle parked on a surface, the ground assembly comprising:

a base plate extending plate-like transversely to a distance direction;

at least one flat coil including a helically wound conductor, the at least one flat coil arranged spaced apart from the base plate in the distance direction;

a core arrangement for magnetic flux control, the core arrangement disposed spaced apart from the base plate and from the at least one flat coil in the distance direction and arranged between the base plate and the conductor;

the core arrangement including at least one core body extending plate-like transversely to the distance direction;

a lower hollow space formed between the at least one core body and the base plate;

at least one support disposed between the at least one core body and the base plate, the at least one support extending through the lower hollow space in the distance direction;

the at least one support formed of a material having a heat conductivity that is greater than 5 W/(m·K);

the at least one flat coil further including a stranded wire carrier, which includes at least one pressure pedestal arranged co-axially to the at least one support, via which the stranded wire carrier is supported on the at least one core body of the core arrangement; and a heat conducting element at least partially surrounding the at least one pressure pedestal and connecting the stranded wire carrier with the at least one core body in a heat-transmitting manner.

2. The ground assembly according to claim 1, wherein the base plate is a cooling plate including a plurality of cooling channels.

3. The ground assembly according to claim 1, wherein:
the heat conducting element includes a plurality of thermally conductive particles embedded in a plastic; and
the plastic has a shore hardness that is less than 10.

4. The ground assembly according to claim 1, wherein the at least one support is at least partially formed of at least one of graphite, a ceramic, and a metal.

5. The ground assembly according to claim 1, wherein:
the heat conducting element includes a plurality of recesses; and
at least one of a density and a size of the plurality of recesses increases with increasing distance from the at least one pressure pedestal.

6. The ground assembly according to claim 1, wherein the heat-conducting element is a perforated film formed as a separate, independent component.

7. The ground assembly according to claim 1, wherein the stranded wire carrier further includes an upper stranded wire carrier and a lower stranded wire carrier between which the at least one flat coil is arranged.

8. The ground assembly according to claim 7, wherein the conductor of the at least one flat coil is at least partially surrounded by a heat-conducting sheath.

9. The ground assembly according to claim 7, wherein:
the conductor of the at least one flat coil penetrates the lower stranded wire carrier;
an electrically insulating layer is arranged between the conductor and the at least one core body; and
the electrically insulating layer has a dielectric strength that is greater than 10 kV.

10. The ground assembly according to claim 1, further comprising a stranded wire holder composed of a plastic, wherein:
the stranded wire holder holds the conductor;
the stranded wire holder and the conductor are completely embedded in a plastic matrix; and the conductor is covered with a coating that increases heat conduction and adhesion to the plastic matrix.

11. The ground assembly according to claim 1, further comprising a distributor plate arranged between the at least one support and the at least one core body, wherein the distributor plate is connected with the at least one core body via an adhesive layer composed of a material having at least one of:
a heat conductivity that is greater than 0.8 W/(m·K); and
a shear modulus that is less than 10 MPa.

12. The ground assembly according to claim 1, further comprising a plurality of positioning elements arranged on the stranded wire carrier for fixing a position of the at least one core body transversely to the distance direction.

13. The ground assembly according to claim 1, wherein at least one of:
an air flow path extends through the lower hollow space; and
at least one electronic component is arranged in the lower hollow space.

14. The ground assembly according to claim 1, further comprising:
a cover plate disposed on a side of the at least one flat coil facing away from the base plate and disposed spaced apart from the at least one flat coil in the distance direction; and
a circuit board arranged between the at least one flat coil and the cover plate.

15. The ground assembly according to claim 1, wherein the heat conducting element includes a plurality of recesses that are arranged evenly distributed.

16. The ground assembly according to claim 1, wherein the heat-conducting element is screen-printed onto at least one of the stranded wire carrier and the at least one core body.

17. The ground assembly according to claim 3, wherein the plastic is silicone.

18. The ground assembly according to claim 9, wherein:
the electrically insulating layer is an insulation film; and
the dielectric strength of the electrically insulating layer is greater than 20 kV.

19. A ground assembly for an inductive charging device for inductively charging a motor vehicle parked on a surface, the ground assembly comprising:
a base plate;
a flat coil including a helically wound conductor and a stranded wire carrier;
a magnetic flux controlling core arrangement including a core body;
a support extending between the core body and the base plate such that a lower hollow space is defined between the core body and the base plate, the support having a heat conductivity that is greater than 5 W/(m·K);
the stranded wire carrier including a pressure pedestal protruding therefrom co-axially to the support, the pressure pedestal supporting the stranded wire carrier on the core body such that the flat coil is disposed spaced apart from the core arrangement; and
a heat conducting element at least partially surrounding the pressure pedestal and connecting the stranded wire carrier with the core body in a heat-transmitting manner.

20. A ground assembly for an inductive charging device for inductively charging a motor vehicle parked on a surface, the ground assembly comprising:
a base plate;

a flat coil including a helically wound conductor and a stranded wire carrier;

a magnetic flux controlling core arrangement including a plurality of core bodies arranged adjacent to one another; a plurality of supports that each extend between an associated core body of the plurality of core bodies and the base plate such that a lower hollow space is defined between the plurality of core bodies and the base plate;

the stranded wire carrier including a plurality of pressure pedestals that each protrude therefrom co-axially to an associated support of the plurality of supports and that each support the stranded wire carrier on an associated core body of the plurality of core bodies such that the flat coil is disposed spaced apart from the core arrangement;

a heat conducting element at least partially surrounding the plurality of pressure pedestals and connecting the stranded wire carrier with the plurality of core bodies in a heat-transmitting manner; and wherein the plurality of supports have a heat conductivity that is greater than 5 W/(m·K).

* * * * *